United States Patent [19]
Ishii et al.

[11] Patent Number: 4,844,558
[45] Date of Patent: Jul. 4, 1989

[54] BRAKE FLUID PRESSURE CONTROL APPARATUS IN SKID CONTROL SYSTEM

[75] Inventors: Akira Ishii; Katsumi Maehara; Bernward Boening; Yoshifumi Akakabe, all of Kanagawa, Japan

[73] Assignee: Nippon ABS, Ltd., Japan

[21] Appl. No.: 97,948

[22] Filed: Sep. 17, 1987

[30] Foreign Application Priority Data

Sep. 19, 1986 [JP] Japan ............................ 61-221034
Aug. 17, 1987 [JP] Japan ............................ 62-203873
Aug. 17, 1987 [JP] Japan ............................ 62-203874

[51] Int. Cl.$^4$ .......................... B60T 8/36; B60T 8/40
[52] U.S. Cl. .................................. 303/119; 303/116
[58] Field of Search .......... 188/181 A; 303/10, 113, 303/114, 115, 116, 119

[56] References Cited

U.S. PATENT DOCUMENTS

| | | | |
|---|---|---|---|
| 4,278,300 | 7/1981 | Bachet | 303/115 |
| 4,395,073 | 7/1983 | Arkawa et al. | 303/116 |
| 4,462,642 | 7/1984 | Leiber | 303/116 X |

FOREIGN PATENT DOCUMENTS

| | | | |
|---|---|---|---|
| 3223146 | 12/1983 | Fed. Rep. of Germany | 303/119 |
| 0223548 | 12/1984 | Japan | 303/119 |
| 0211154 | 9/1986 | Japan | 303/116 |
| 0012452 | 1/1987 | Japan | |
| 1513805 | 6/1978 | United Kingdom | 303/116 |
| 2072283 | 9/1981 | United Kingdom | 303/116 |

Primary Examiner—Andres Kashnikow
Assistant Examiner—Timothy Newholm
Attorney, Agent, or Firm—Jones, Day, Reavis & Pogue

[57] ABSTRACT

A brake fluid pressure control apparatus in a skid control system for a vehicle includes an electromagnetic change-over valve arranged in a conduct between a master and a wheel cylinder for the wheel. The electromagnetic change-over valve receives control signals of a control unit measuring the skid condition of the wheel to control the fluid pressure to the wheel cylinder. A hydraulic reservoir which, when the brake fluid pressure to the wheel cylinder is decreased with control of the electromagnetic change-over valve, reserves the brake fluid discharged through the electromagnetic change-over valve from the wheel cylinder and a fluid pressure pump supplies the brake fluid from the hydraulic reservoir into the wheel cylinder. A two-position electromagnetic change-over valve enables a change-over into a cut-off state or a communicating state. The valve is a conduit between the hydraulic reservoir and the fluid pressure pump.

10 Claims, 4 Drawing Sheets

BRAKE FLUID PRESSURE CONTROL APPARATUS IN SKID CONTROL SYSTEM

BACKGROUND OF THE INVENTION

1. Field of the Invention

This invention relates to a brake fluid pressure control apparatus in a skid control system for a vehicle having at least one wheel and a brake for the wheel in which the brake fluid pressure to the wheel cylinder of the brake for the wheel is controlled in accordance with the rotational condition or skid condition of the wheel, and more particularly to a brake fluid pressure control apparatus of the type in which, when the brake for the wheel is relieved, brake fluid is discharged through a fluid pressure control valve device from the wheel cylinder of the brake into a hydraulic reservoir.

2. Description of the Prior Art

Japanese Patent Opening No. 142733/1981 (U.S. Pat. No. 4,395,073) discloses a brake fluid pressure control apparatus in a skid control system for a vehicle having at least one wheel and a brake for the wheel which includes a fluid pressure control valve device arranged between a master cylinder and a wheel cylinder of a brake for the wheel. The fluid pressure control valve device receives control signals from a control unit measuring the skid condition of the wheel to control the brake fluid pressure to the wheel cylinder. A hydraulic reservoir, reserves the brake fluid discharged through said fluid pressure control valve device from said wheel cylinder when the brake fluid pressure to said wheel cylinder is decreased with control of said fluid pressure control valve device. A pressure fluid supply conduit connects the master cylinder with the fluid pressure control valve device and a fluid pump for returns the brake fluid from said hydraulic reservoir into said pressure fluid supply conduit. A first check valve is arranged in said pressure fluid supply conduit to open when the brake fluid flows from said master cylinder toward said fluid pressure control valve device. The outlet of said fluid pump is connected to said pressure fluid supply conduit between said first check valve and said fluid pressure control valve device. A pressure fluid return conduit connects said master cylinder with said wheel cylinder. A second check valve is arranged in said pressure fluid return conduit to open when the brake fluid flows from said wheel cylinder toward said master cylinder. A hydraulic accumulator receives the brake fluid discharged from said fluid pump. Indeed, kick-back of the brake pedal connected to the tandem master cylinder can be prevented with the above described brake fluid pressure control apparatus. However, the hydraulic accumulator includes a strong spring for accumulating a high pressure of fluid discharged from the outlet of the fluid pressure pump. Accordingly, the hydraulic accumulater is large in volume and is heavy. Further, the above brake fluid pressure control apparatus includes the first and second check valves and so the number of the parts is large. And since the brake fluid is temporarily accumulated in the hydraulic accumulator, the above brake fluid pressure control apparatus has the defect that the required amount of the fluid is increased.

Further, the Japanese patent opening No. 12452/1987 discloses the brake fluid pressure control apparatus in which a change-over valve apparatus is arranged between the master cylinder and the wheel cylinder and further, the electro magnetic cut-off valve is arranged between the wheel cylinder and the fluid pressure pump. The outlet of the fluid pressure pump is not directly connected to the master cylinder in the above arrangement. Accordingly, kickback of the pedal is very little. However, the pressurized brake fluid is discharged from the fluid pressure pump during the time when the electromagnetic cut-off valve is cut off. Accordingly, high pressure is applied to a seal portion of the electro magnetic cut-off valve. This may damage the seal portion of the electro magnetic cut-off valve. In that apparatus, when the pressure of the wheel cylinder is increased, the electro magnetic cut-off valve is put into the communicating state.

SUMMARY OF THE INVENTION

Accordingly, it is an object of this invention to provide a brake fluid pressure control apparatus in the skid control system for vehicle which can prevent or considerably reduce kickback of the brake pedal and reduce the number of parts and by which, the whole of the apparatus can be small-sized and lightened and can have a long life.

In accordance with an aspect of this invention, a brake fluid pressure control apparatus in a skid control system for a vehicle having at least one wheel and a brake for the wheel including; (A) a fluid pressure control valve device arranged in a conduit between a master cylinder and a wheel cylinder of a brake for the wheel, said fluid pressure control valve device receiving control signals of a control unit measuring the skid condition of the wheel to control the brake fluid pressure to said wheel cylinder; (B) a hydraulic reservoir which, when the brake fluid pressure to said wheel cylinder is decreased with control of said fluid pressure control valve device, reserves the brake fluid discharged through said fluid pressure control valve device from said wheel cylinder; and (C) a fluid pump being able to pressurize and supply the brake fluid from said hydraulic reservoir into said wheel cylinder, and in the apparatus, a valve apparatus to be able to changeover into a cut-off state or a communicating state is arranged in a conduit between said hydraulic reservoir and said fluid pump.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Next, embodiments of this invention will be described with reference to the drawings.

Figure 1:
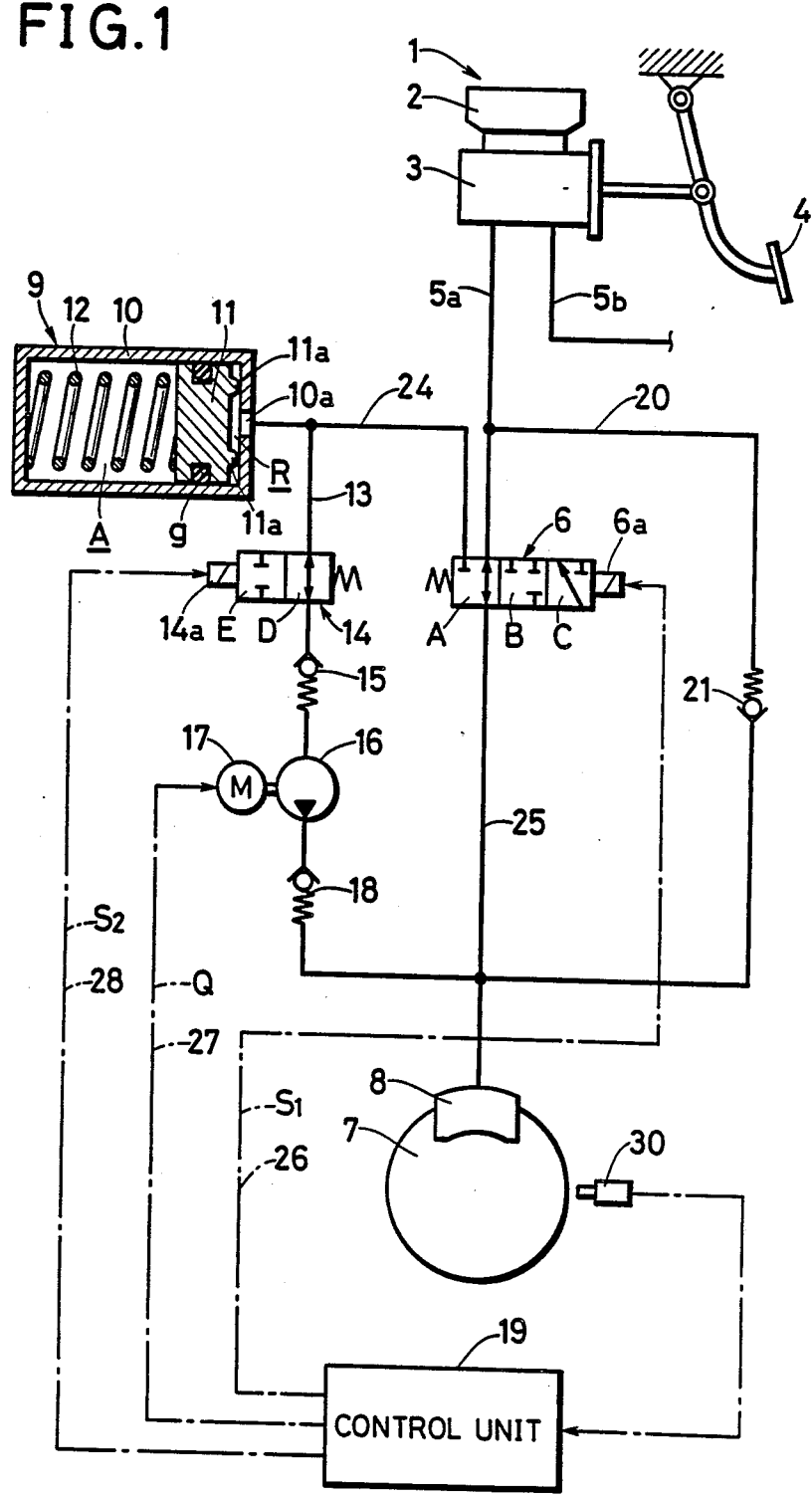
FIG. 1 is a schematic view of a fluid pressure control apparatus in a skid control system according to a first embodiment of this invention.

FIG. 1 shows a first embodiment of this invention. Referring to FIG. 1, a tandem master cylinder 1 as a pressure generating source is combined with a brake pedal 4. In the tandem master cylinder 1, a hydraulic reservoir 2 is fixed to a cylindrical body 3. One of two fluid pressure generating chambers in the body 3 of the tandem master cylinder 1 is connected through conduit 5a, a three-port, three-position electro magnetic change-over valve 6 and a conduit 25 to a wheel cylinder 8 as a brake apparatus of a wheel 7. Another of the two fluid pressure generating chambers in the body 3 of the tandem master cylinder 1 is connected through a conduit 5b and the corresponding parts shown in FIG. 1 to a wheel cylinder of another wheel in another system. The other system is similar to the conduit system shown in FIG. 1.

A discharge opening of the change-over valve 6 is connected through a conduit 24 into a hydraulic reservoir 9. The reservoir 9 has a well known construction. A piston 11 provided with a seal ring g is slidably fitted into a casing 10. A reservoir chamber R and an air chamber A are formed by the piston 11. A spring 12 is arranged in the air chamber A under the compressed condition, and urges the piston 11 rightwards in FIG. 1. Projections 11a formed integrally with the piston 11 contact with the inside wall of the reservoir 10.

A conduit 13 divided from the conduit 24 is connected to a two-position electro magnetic change-over valve 14. It is further connected through a check valve 15 to a suction opening side of a fluid pressure pump 16. The fluid pressure pump 16 is driven by an electric-motor 17. A discharge opening of the fluid pressure pump 16 is connected through a check valve 18 and a conduit 20 to the wheel cylinder 8 of the wheel 7.

A check valve 21 is connected in parallel with the change-over valve 6. It permits fluid to flow only in the direction from the wheel cylinder side towards the tandem master cylinder side. The above check valve 15 permits fluid to flow only in the direction from the change-over valve 14 side towards the suction opening side of the fluid pressure pump 16. And the check valve 18 permits fluid to flow only in the direction from the discharge opening side of the fluid pressure pump 16 towards the wheel cylinder 8 side.

The three-port, three-position electro magnetic change-over valve 6 takes any one of three positions A, B and C in accordance with the level of the current supplied to its solenoid portion 6a. When the current level is "0", it takes a first position A in which the conduit 5a and 25 are connected. When the current level is "½", it takes a second position B in which the conduits 5a and 25 are disconnected. And when the current level is "1", it takes a third position C in which the conduit 5a and 25 are disconnected from each other, but the conduits 25 and 24 are connected.

The two-position electro magnetic change-over valve 14 takes one position D, when a current level to its solenoid portion 14a is "0". In the D position, the conduit 13 and the check valve 15 side are connected. When the solenoid portion 14a is energized, the change-over valve 14 takes another position "E" in which the conduit 13 and the check valve 15 side are disconnected from each other.

A wheel speed sensor 30 is associated with the wheel 7. The detecting out-put of the wheel speed sensor 30 is supplied to a control unit 19. The control unit 19 has a well known circuit construction, and judges the skid condition of the wheel 7 from the detected output of the wheel speed sensor 30. It generates signals "$S_1$" and "$S_2$" which are supplied to the solenoid portions 6a and 14a of the change-over valves 6 and 14, respectively. The control unit 19 further generates a drive signal "Q" for the electric-motor 17.

Operation of the above described brake fluid pressure control apparatus is as follows.

It is now assumed that the vehicle with the above apparatus runs at a constant speed. The brake pedal 4 is depressed by the vehicle driver. Initially, the signals $S_1$ and $S_2$ from the control unit 19 are "0". Accordingly, the charge-over valves 6 and 14 take the positions A and D, respectively. Accordingly, the fluid pressure from the master cylinder 1 is transmitted through the conduit 5a, the change-over valve 6 and the conduit 25 to the wheel cylinder 8 of the wheel 7 braking the wheel 7. At a certain time, when the control unit 19 judges that the brake of the wheel 7 should be relieved, the control signal $S_1$ becomes "1" and further the other control signal $S_2$ becomes "1". Accordingly, the change-over valve 6 takes the position C, while the change-over valve 14 takes the position E. Thus, the conduits 5a and 25 are disconnected from each other, while the conduits 25 and 24 are connected. Accordingly, the pressurized fluid from the wheel cylinder 8 is discharged through the conduits 25 and 24 into the reservoir chamber R of the hydraulic reservoir 9, relieving the brake of the wheel 7. However, the change-over valve 14 takes the position E to disconnect the conduit 13 side and fluid pump 16 side from each other. Accordingly, the fluid pump 16 merely rotates idly. It does not discharge the pressurized fluid and the fluid pressure is not supplied to the wheel cylinder 8 of the wheel 7.

Next, when the control unit 19 judges that the braking of the wheel 7 should no longer be relieved and should be maintained at a constant, the signal $S_1$ becomes "½". The other signal $S_2$ remains "1". The change-over valve 6 is changed over to the position B. The conduit 5a and 25 are disconnected from each other and further the conduits 24 and 25 are disconnected from each other. Thus, the fluid pressure of the wheel cylinder 8 is maintained constant and the braking force to the wheel 7 is maintained constant.

Next, the control unit 19 judges that the braking of the wheel 7 should be increased. The signal $S_1$ remains "½", but the signal $S_2$ becomes "0". The change-over valve 14 takes the position D. Thus, the side of the conduit 13 and the side of the fluid pressure pump 16 are connected, the brake fluid reserved in the hydraulic reservoir 9 is pumped by the fluid pressure pump 16 and supplied through the conduit 20 into the wheel cylinder 8. Thus, the braking of the wheel 7 is increased. When the control signal $S_2$ is pulsed as 0, 1, 0, 1 ..., the braking force to the wheel 7 is increased step wise. Thus, the braking is slowly increased.

A certain time, when the control unit 19 judges that the braking force to the wheel 7 should be reduced, the signal $S_1$ becomes "1" and the signal $S_2$ becomes "0". Accordingly, in the above described manner, the pressurized fluid from the wheel cylinder 8 is discharged into the reservoir 9. Thus, braking of the wheel 7 is relieved.

The processes of relieving, holding and increasing the braking are repeated as described above. It is now assumed that the frictional coefficient $\mu$ of the road is rapidly changed from low-$\mu$ to high-$\mu$, or that the $\mu$-jump occurs. It is required that the pressurized fluid of higher pressure is supplied to the wheel cylinder 8. The control unit 19 detects the $\mu$-jump, and make the level of the signal $S_1$ "0". The change-over valve 6 takes the position A. The pressurized fluid is supplied from the master cylinder 1 to the wheel cylinder 8. Accordingly, the required braking force can be supplied to the wheel 7 running on the high-$\mu$ road. Although the operations of the anti-skid brake apparatus of this embodiment have been described, it has the following advantages.

In this embodiment, the accumulator to hold temporarily the pressurized fluid discharged from the fluid pressure pump is not required. When the brake is relieved, the change-over valve 14 is changed over to the position E in which the fluid pressure pump 16 cannot pump the brake fluid from the reservoir 9 but rotates idly. The discharge opening of the fluid pressure pump 16 is not connected to the master cylinder 1, but is directly connected to the wheel cylinder 8 of the wheel 7. Accordingly, a check valve to prevent the so-called pedal-kick phenomenon as in the prior art is not required. Accordingly, the whole apparatus can be small in comparison with the apparatus taught in the prior art and further its weight can be reduced in comparison.

When the pressurized fluid is discharged from the wheel cylinder 8 into the reservoir 9, the conduits 13 and 20 are cut off from each other by the change-over valve 14, and so the fluid pressure pump 16 idles. Although the check valve 21 permits fluid to flow towards the master cylinder 1, no kick-back is imparted to the pedal 4.

When the brake is reapplied to the wheel 7, the change-over valve 14 is changed over to the D-position, and the brake fluid is pumped and supplied to the wheel cylinder 8 by the fluid pressure pump 16. The braking force to the wheel 7 is increased. However, the fluid pressure of the wheel cylinder 8 is then sufficiently low, and so little fluid pressure is transmitted through the check valve 21 to the master cylinder side. Little kick-back is imparted to the pedal 4. When the fluid pressure of the wheel cylinder 8 becomes sufficiently high, fluid pressure applied through the check valve 21 to the master cylinder side becomes high, and so some kick-back is imparted to the pedal 4. However the kick-back is very little in comparison with the prior art in which the outlet of the fluid pressure pump is directly connected to the master cylinder.

Figure 2:
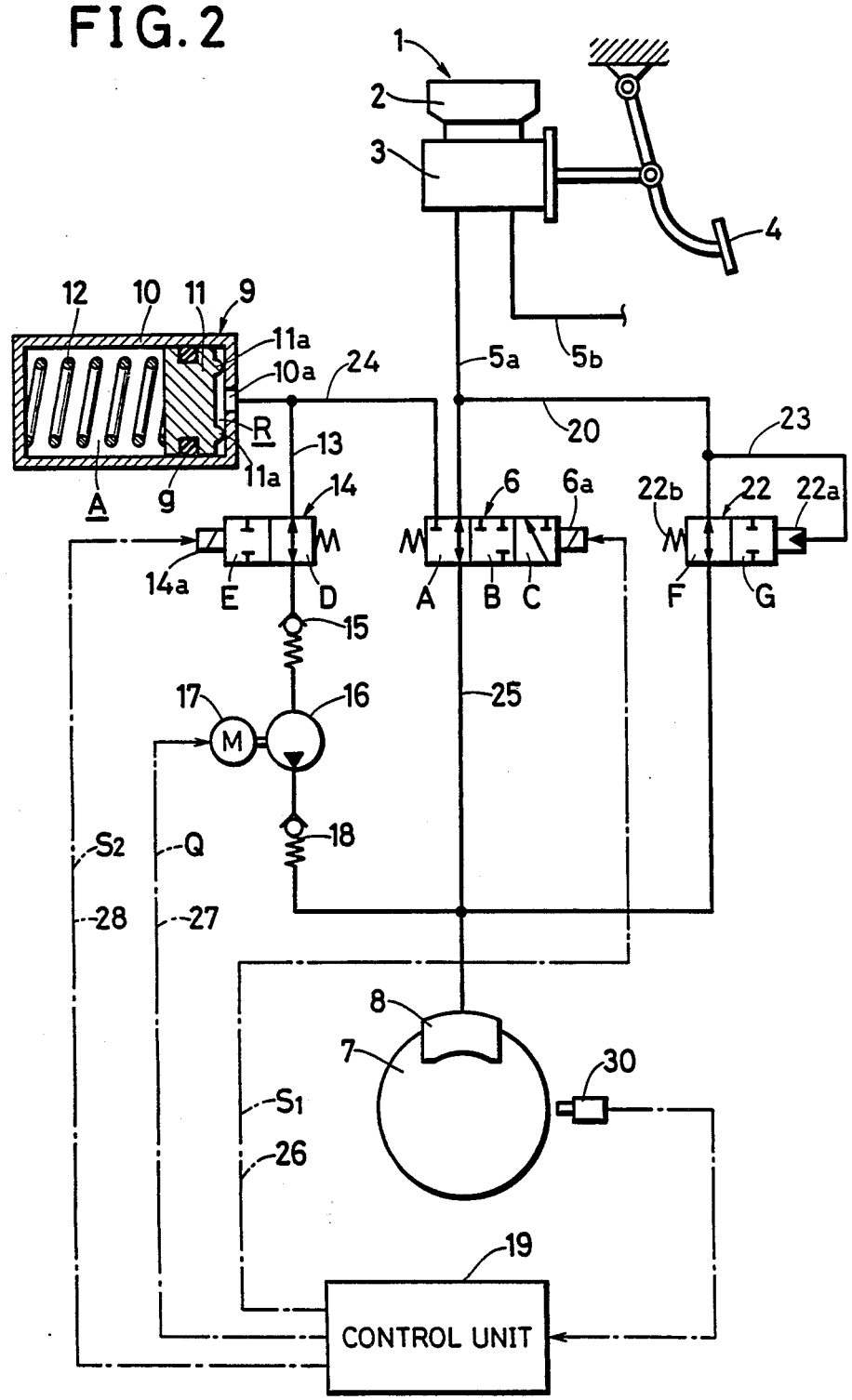
FIG. 2 is a schematic view of a fluid pressure control apparatus in a skid control system according to a second embodiment of this invention.

FIG. 2 shows a second embodiment of this invention. Parts in FIG. 2 which correspond to those in FIG. 1 are denoted by the same reference numerals, the description of which will be omitted.

In comparison with the embodiment of FIG. 1, the check valve 21 is omitted and a pressure-responsive change-over valve 22 is connected in the conduit 20. A pressure-sensing portion 22a of the change-over valve 22 receives the fluid pressure of the master cylinder 1 through a pressure-detecting conduit 23. When the fluid pressure of the detecting conduit 23 is lower than a predetermined pressure (sufficiently low pressure), the change-over valve 22 takes a position F determined by a spring portion 22b. In the position F, the side of the master cylinder 1 and the side of the wheel cylinder 8 are connected. And when the fluid pressure of master cylinder 1 becomes higher than the predetermined pressure, the change-over valve 22 takes another position G. In the position G, the side of the master cylinder 1 and the side of the wheel cylinder 8 are disconnected from each other.

In operation, the fluid pressure of the master cylinder 1 is supplied both through the change-over valve 6 and through the change-over valve 22 to the wheel cylinder 8; at the initial stage of the braking operations. Since the predetermined pressure set in the change-over valve 22 is sufficiently low, the change-over vlave 22 is changed over into the G position almost directly after treading the brake pedal 4. Accordingly, the fluid pressure of the master cylinder is then supplied only through the change-over valve 6 to the wheel cylinder 8.

As described in the first embodiment, the brake is relieved, it is maintained at constant and then it is increased. Such control is repeated. When the brake is reapplied, brake fluid is pumped from the reservoir 9 by the fluid pressure pump 16 and it is supplied into the wheel cylinder 8. At that time, the fluid pressure of the master cylinder 1 is sufficiently high. Accordingly, the change-over valve 22 is taking the position G. The pulsed pressure of the fluid pump 6 is never applied to the master cylinder side. Thus, the pedal reaction is zero.

When the brake pedal 4 is released, the fluid pressure of the master cylinder 1 becomes zero almost at once and the change-over valve 22 takes the position F. Acordingly, the pressurized fluid is rapidly returned through the change-over valve 22 into the master cylinder 1. The other operations and effects are the same as those of the first embodiment.

Figure 3:
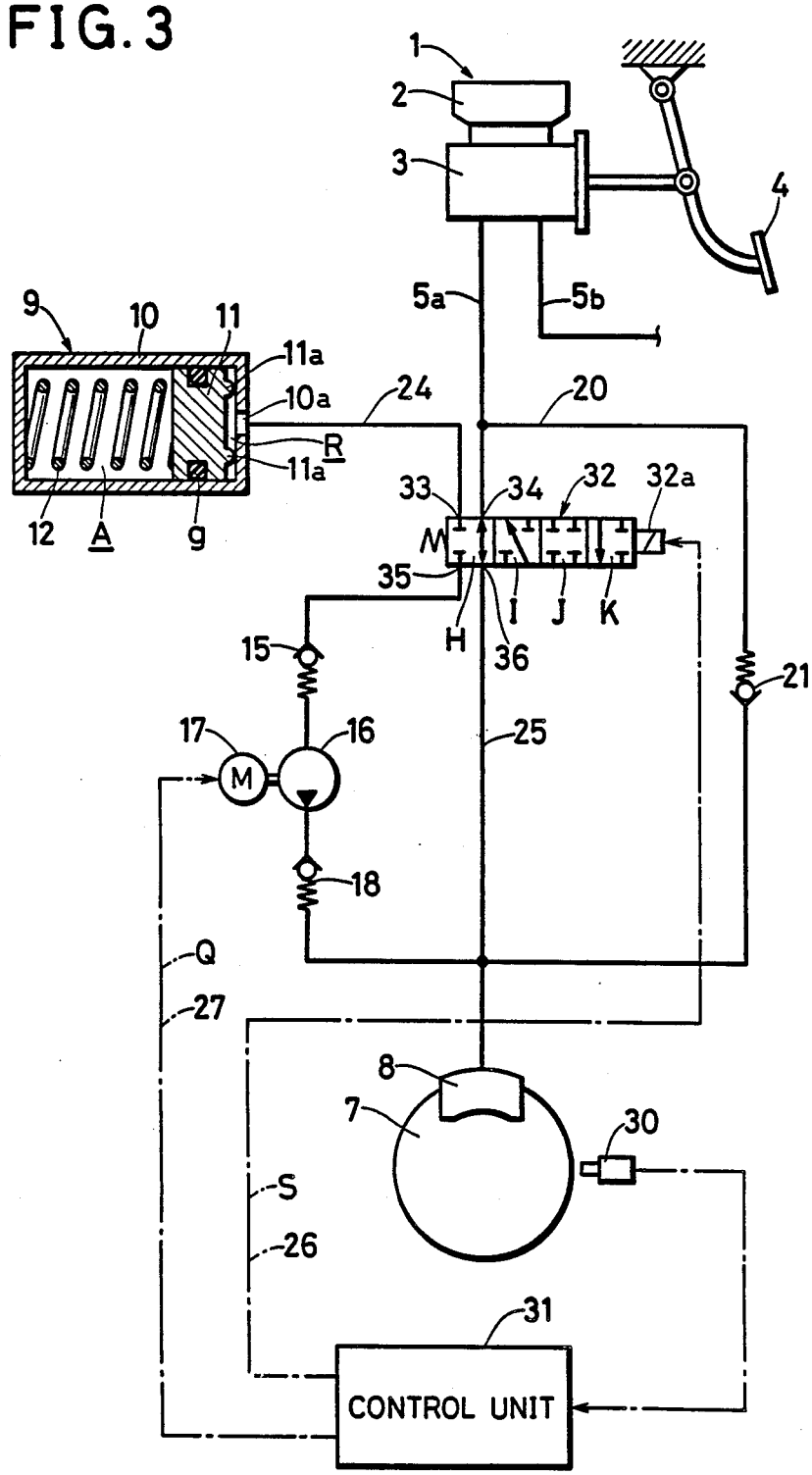
FIG. 3 is a schematic view of a fluid pressure control apparatus in a skid control system according to a third embodiment of this invention.

FIG. 3 shows a third embodiment of this invention. Parts in FIG. 3 which correspond to those in FIG. 1, are denoted by the same reference numerals, the description of which will be omitted.

In comparison with the embodiment of FIG. 1, the change-over valve 14 in FIG. 1 is omitted and the master cylinder 1 is connected through a four-port, four-position electro magnetic change-over valve 32 and the conduit 25 to the wheel cylinder 8. The change-over valve 32 has also the function of the change-over valve 14 of FIG. 1. A control signal S from a control unit 31 is supplied to a solenoid portion 32a of the change-over valve 32. The control signal S can take four current levels. When the level of the control signal S is "0", the change-over valve 32 takes a first position H in which the side of the master cylinder 1 and the side of the wheel cylinder 8 are connected. When the current level of the control signal S is "1", the change-over valve 32 takes a second position I in which the side of the master cylinder 1 and the side of the wheel cylinder 8 are disconnected from each other, while the side of the wheel cylinder 8 and the side of the reservoir 9 are connected. When the current level of the control signal S is "2", the change-over valve 32 takes a third position J in which all of the conduits 5a 25, 24 and 38 are disconnected from one another. And when the current level of the control signal S is "3", the change-over valve 32 takes a fourth position K in which the side of the fluid pressure pump 16 and the side of the reservoir 9 are connected, while the side of the master cylinder 1 and the side of the wheel cylinder 8 are disconnected from each other. An input port 34 of the change-over valve 32 is connected to the conduit 5a. A first output port 33 thereof is connected to the conduit 24, a second output port 35 is connected to the conduit 38, and a third output port 36 thereof is connected to the conduit 25.

Next, operations of the embodiment of FIG. 3 will be described.

When the brake pedal 4 is depressed, the fluid pressure of the master cylinder 1 is supplied through the conduit 5a, the change-over valve 32 which takes the first position H, and the conduit 25 into the wheel cylinder 8. The wheel 7 is braked. When the control unit 31 judges that the brake of the wheel 7 should be relieved, a control signal S from a control unit 31 becomes "1" as the change-over valve 34 takes the second position I. The conduits 24 and 25 are connected, while the conduits 5a and 25 are disconnected from each other. The pressurized fluid is discharged through the conduit 25, the change-over valve 32 which takes the second position I, and the conduit 24 into the reservoir 9. Thus, the brake of the wheel 7 is relieved. The motor drive signal Q becomes "1" with the control signal S. The motor 17 starts to drive the fluid pressure pump 16. However, since the change-over valve 32 takes the second position I, the conduits 24 and 35 are disconnected from each other. Accordingly the fluid pressure pump 16 idles and the fluid pressure is not supplied to the wheel cylinder 8.

When the control unit 31 judges that the brake of the wheel 8 should be maintained constant, the control signal S becomes level "2". Thus, all of the conduits 5a 25, 24 and 38 are intercepted from one another. Thus, the brake of the wheel 7 is maintained at constant.

When the control unit 31 judges that the braking of the wheel 7 should be increased, the control signal S become "3", and the change-over valve 32 takes the fourth position K. The side of the reservoir 9 and the side of the fluid pressure pump 16 are connected. Brake fluid flows through the conduit 24, the change-over valve 32 which takes the position K, and the conduit 38 and is supplied into the wheel cylinder 8 by the fluid pressure pump 16. Thus, the braking force of the wheel 7 is increased. This embodiment is simpler in construction than the above embodiments, since the change-over valve 14 is combined with the change-over valve 32.

The other operations and effects of this embodiment are the same as those of the other embodiments.

Figure 4:
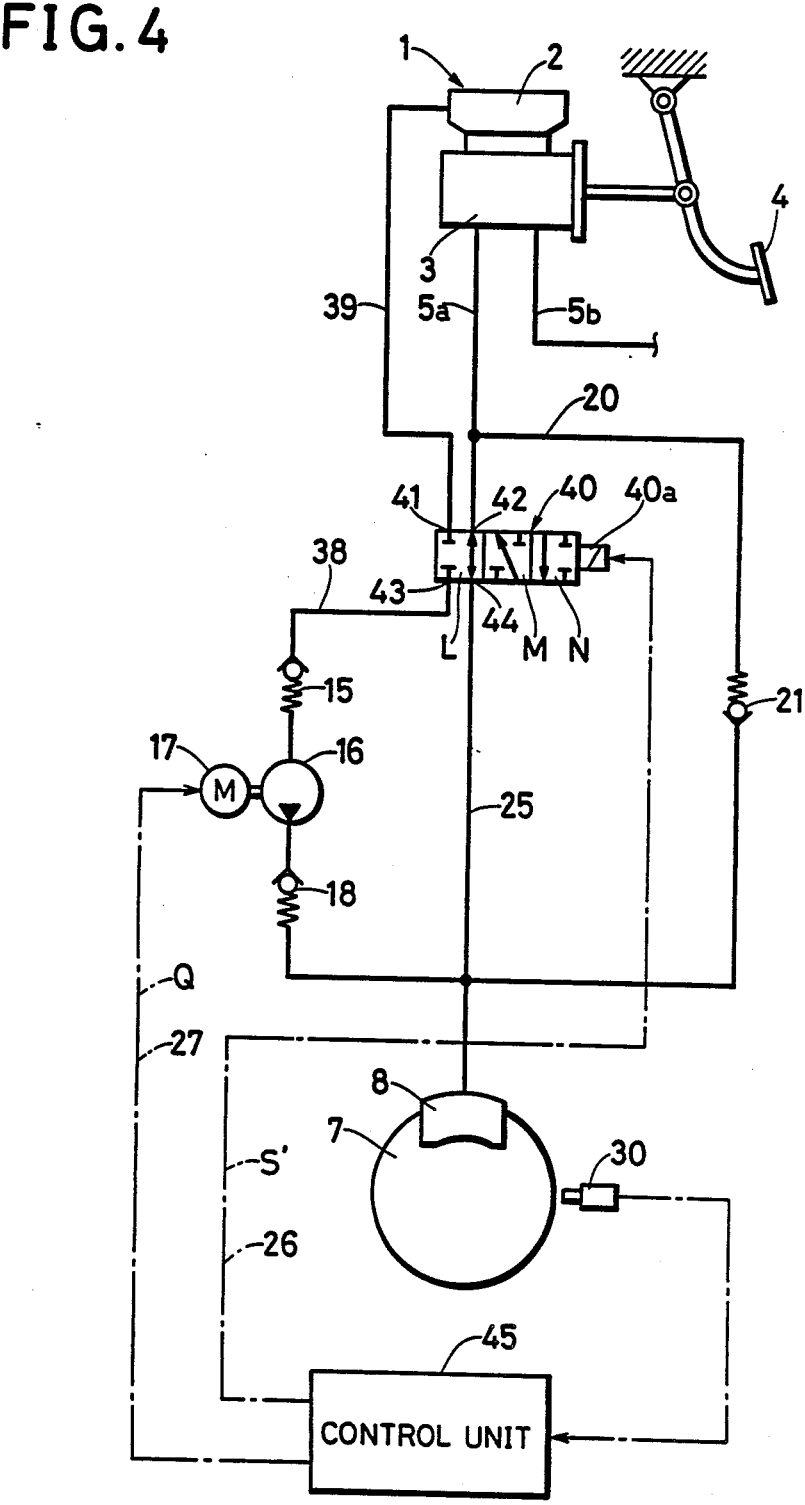
FIG. 4 is a schematic view of a fluid pressure control apparatus in a skid control system according to a fourth embodiment of this invention.

FIG. 4 shows a fourth embodiment of this invention. Parts in FIG. 4 which correspond to those in FIG. 1, are denoted by the same reference numerals.

In comparison with the above embodiments, the hydraulic reservoir 9 is omitted and the master cylinder 1 is connected through a four port, three-position electro magnetic valve 40 which has also the function of the valve 14 of FIG. 1, to the wheel cylinder 8. The change-over valve 40 is connected through a conduit 39 to the reservoir 2 for the tandem master cylinder 1. An input port 42 of the change-over valve 40 is connected to the conduit 5a. A first output port 41 thereof is connected to the conduit 39. A second output port 43 thereof is connected to the conduit 38 and a third output port 44 thereof is connected to the conduit 25. A control signal S' from a control unit 45 is supplied to a solenoid portion 40a of the change-over valve 40. When the current level of the control signal S' is "0", the change-over valve 40 takes a first position L in which the conduits 5a and 25 are connected, while the conduits 39 and 38 are disconnected from each other. When the current level of the control signal S' is "½", the change-over valve 40 takes a second position M in which the conduits 5a and 25 are disconnected from each other, while the conduits 39 and 25 are connected. When the current level of the control signal S' is "1", the change-over valve 40 takes a third position N in which the conduits 5a and 25 are disconnected from each other, while the conduit 39 and 38 are connected.

Next, operations of the embodiment of FIG. 4 will be described.

When the control unit 45 judges that the brake of the wheel 7 should be relieved, the control signal S' becomes "½". The change-over valve 40 takes position M. The pressurized fluid from the wheel cylinder 8 is discharged through the conduit 25, the change-over valve 40 which takes the position M, and the conduit 39 into the reservoir 2 for the tandem master cylinder 1. Fluid pressure pump 16 starts in response to the signal S'. However, since the fluid pressure pump 16 and the reservoir 2 are disconnected from each other, the fluid pressure pump 16 merely idles. Brake fluid is not drawn from the reservoir 2.

When the control unit 45 judges that the brake of wheel 7 should be increased, the current level of the control signal S' becomes "1". The change-over valve 40 takes the position N. The conduits 5a and 25 are disconnected from each other, while the conduits 39 and 38 are connected. Thus, the fluid pressure pump 16 is connected to the reservoir 2 for the tandem master cylinder 1. The brake fluid is drawn from the reservoir 2 and supplied into the wheel cylinder 8 by the fluid pressure pump 16. Thus, braking of wheel 7 is increased.

When the coefficient of friction of the road has changed from low $\mu$ to high $\mu$ and the braking force should be rapidly increased, the control signal S' becomes "0". The side of the master cylinder 1 and the side of wheel cylinder 8 are connected and pressurized fluid is supplied from the master cylinder 1 into the wheel cylinder 8. The braking force of the wheel 7 is rapidly increased.

In comparison with the embodiment of FIG. 3, the embodiment of FIG. 4 has further the following advantages.

In the embodiment of FIG. 4, the special hydraulic reservoir 9 receiving the fluid from the wheel cylinder 8 is not used, but the reservoir 2 for the master cylinder 1 is used for receiving the brake fluid from the wheel cylinder 8 when the brake of the wheel 7 is relieved. Further, the four port, three position electro magnetic valve is used instead of the four port, four position electro magnetic change-over valve. Accordingly the construction of the fourth embodiment is simplier than the third embodiment. Further, sufficient amount of brake fluid can always be secured in the reservoir 2 for the tandem master cylinder 1. Of course, the change-over valve 40 has also the function of the change-over valve 14 of FIG. 1.

While the preferred embodiments have been described, variations thereto will occur to those skilled in the art within the scope of the present inventive concepts which are delineated by the following claims.

Thus for example, in the above embodiments of FIG. 1 & FIG. 2, the change-over valve 14 normally takes the position D in which the conduits 13 and 20 are connected, and when the solenoid portion 14a is energized, it takes the position E in which the conduits 13 and 20 are disconnected from each other. However, instead, the change-over valve 14 may take normally the position E and when the solenoid portion 14a is energized, it may take the position D. The control unit 19 is so constructed as to effect the above control of the change-over valve 14.

Further, also in the embodiment of FIG. 1, FIG. 2 and FIG. 3, the hydraulic reservoir 9 may be omitted and the reservoir 2 for the tandem master cylinder 1 may be used also to receive the brake fluid discharged from the wheel cylinder 8.

Further, in the embodiment of FIG. 4, an electromagnetic cut-off valve may be arranged between the master cylinder 1 and the change-over valve 40 so that the braking of the wheel 7 can be kept constant in the anti-skid control operation. In that case, the cut-off valve is put into the cut-off state and the change-over valve 40 takes the position L. Without using the above cut-off valve, the change-over valve 40 may be changed over repeatedly in short intervals between the position L and the position M. The braking force of the wheel 7 can be thus kept substantially constant.

Further the above embodiment may be used as a drive-force control apparatus (a so-called ASR control apparatus) for preventing the slip of the drive wheel on the start of the vehicle.

Further in the embodiment of FIG. 2, the change-over valve 22 as the second valve apparatus is controlled with the fluid pressure. Instead it may be electrically controlled. For example, the change-over valve 22 may be changed over by on-off signal of an electrical brake switch arranged near the brake pedal 4.

What is claimed is:

1. In a brake fluid pressure control apparatus in a skid control system for a vehicle having at least one wheel and a brake for the wheel including a fluid pressure control valve device arranged in a conduit between a master cylinder and a wheel cylinder of a brake for the wheel, said fluid pressure control valve device receiving control signals of a control unit means measuring the skid condition of the wheel to control the brake fluid pressure to said wheel cylinder; a hydraulic reservoir which is connected through a first conduit to a discharging port of said fluid pressure control valve device and which, when the brake fluid pressure to said wheel cylinder is decreased with control of said fluid pressure control valve device, reserves the brake fluid discharged through the discharging port of said fluid pressure control valve device from said wheel cylinder; and a fluid pump capable of pressurizing and supplying the brake fluid from said hydraulic reservoir into said wheel cylinder, the improvements in which a valve apparatus capable of changing between a cutoff state and a communicating state is arranged in a second conduit between said hydraulic reservoir and said fluid pump, the suction side of said fluid pump connected to said valve apparatus and the discharging side of said fluid pump connected to the wheel cylinder, said control unit means controlling said fluid pump such that said fluid pump continues to be driven during the antiskid control operation after a first control signal for decreasing the brake fluid pressure to said wheel cylinder is generated from said control unit means, said valve apparatus so controlled as to be put into said cut-off state by said control unit means, at least when control signals for again decreasing the brake fluid pressure to said wheel cylinder are generated from said control unit means.

2. A brake fluid pressure control apparatus according to claim 1 in which said apparatus further comprises a second valve apparatus capable of changeover between a cutoff state and a communicating state that is arranged in a third conduit between said master cylinder and said wheel cylinder.

3. A brake fluid pressure control apparatus according to claim 2 in which said second valve apparatus is changed over into the cutoff state by said control unit means when the fluid pressure of said master cylinder becomes higher than a predetermined pressure, and is changed over into the communicating state when the fluid pressure of said master cylinder becomes lower than said predetermined pressure.

4. A brake fluid pressure control apparatus according to claim 2 in which said valve apparatus is combined as one body with said fluid pressure control valve device.

5. A brake fluid pressure control apparatus according to claim 4 in which said fluid pressure control valve device combined with said valve apparatus is a four-port, three-position electromagnetic valve, and an input port of said fluid pressure control valve device is connected to said master cylinder, a first output port as said discharging port is connected to said hydraulic reservoir, a second output port thereof is connected to said wheel cylinder and a third output port thereof is connected to a suction side of said fluid pump.

6. A brake fluid pressure control apparatus according to claim 1 in which a hydraulic reservoir for said master cylinder is used as said hydraulic reservoir.

7. A brake fluid pressure control apparatus according to claim 6 in which said valve apparatus is combined as one body with said fluid pressure control valve device.

8. A brake fluid pressure control apparatus according to claim 1 in which said valve apparatus is combined as one body with said fluid pressure control valve device.

9. A brake fluid pressure control apparatus according to claim 8 in which said fluid pressure control valve device combined with said valve apparatus is a four-port, four-position electromagnetic valve, and an input port of said fluid pressure control valve device is connected to said master cylinder, a first output port as said discharging port thereof is connected to said hydraulic reservoir, and a second output port thereof is connected to said wheel cylinder and a third output port thereof is connected to a suction side of said fluid pump.

10. A brake fluid pressure control apparatus according to claim 8 in which said fluid pressure control valve device combined with said valve apparatus is a four-port, three-position electromagnetic valve, and an input port of said fluid pressure control valve device is connected to said master cylinder, a first output port as said discharging port is connected to said hydraulic reservoir, a second output port thereof is connected to said wheel cylinder and a third output port thereof is connected to a suction side of said fluid pump.

* * * * *